United States Patent Office 3,168,494
Patented Feb. 2, 1965

3,168,494
FURFURAL CROSSLINKED FURFURYL ALCOHOL RESIN
Ignatius Metil, Buffalo, N.Y., assignor to American Pipe & Construction Co., Monterey Park, Calif., a corporation of Delaware
No Drawing. Filed Nov. 9, 1959, Ser. No. 851,530
3 Claims. (Cl. 260—67)

The present invention is directed to improvements in furfuryl alcohol resins and particularly resins of this type suitable for employment in the production of films, castings, cements and coatings possessing high chemical resistance.

Polymers of furfuryl alcohol are known to possess good chemical resistance but suffer from the defect that they are relatively solvent soluble as they are subject to swelling.

It is an object of the present invention to produce a final resin by crosslinking polymers of furfuryl alcohol having high resistance to solvent action while retaining the resistance to the action of acids and alkalies.

In broad aspect of the present invention, a thermosetting furfuryl alcohol resin is prepared in two stages; the first stage being probably polymerization of furfuryl alcohol in the presence of an acid catalyst; the second stage being probably a crosslinking of the polymerized furfuryl alcohol with a crosslinking agent having functional hydrogen in the molecules, as for instance furfural, the crosslinking occurring also under acid conditions.

In the first processing stage of the present invention, furfuryl alcohol is polymerized under such conditions that the accompanying exothermic reaction can be controlled. This polymerization is performed in the presence of a suitable acid catalyst by heating the furfuryl alcohol and acid catalyst, generally under vacuum, and discontinuing the reaction when a condensation polymer is formed having a viscosity within the range of about 30 poises to 200 poises and preferably in the range 45 to 100 poises. At this desired stage in the reaction, the effect of the catalyst on the ingredients of the system is eliminated generally by counteracting the effect of the catalyst. This is very readily done by neutralizing the acid catalyst with any suitable alkali, as for instance, caustic soda.

In accordance with the invention the neutralized system wherein the effect of the catalyst has been eliminated, is then subjected to distillation, preferably under vacuum wherein water is the main constituent removed from the system, and distillation is continued until the moisture content is in the neighborhood of 1% or less. In general, the amount of moisture removed from the system represents about 10 to 12% of the weight of furfuryl alcohol initially treated.

To the condensation polymer thus produced there is then added, in accordance with the present invention and to permit performance of the second stage of the process, a deisred amount of furfuraldehyde or furfural. The amount of furfural added will depend upon the properties desired in the final set material, the higher the amount of furfural, in general producing a final product with greater chemical resistance, but a product which is harder and more brittle as compared with products formed by reaction with lesser amount of furfural. Final products produced by reaction with the greater amounts of furfural possess somewhat less adhesion.

The amount of furfural employed for crosslinking the polymerized furfuryl alcohol, for general purpose operations, will fall within the range of from about 10% to 400% by weight of the polymerized furfuryl alcohol produced in the first stage as above indicated. In general, it is recommended as a preferred composition that the furfural to be added, represent about 40% by weight based upon the amount of furfuryl alcohol initially employed, which will be approximately 43% based upon the weight of the polymer system after removal of moisture therefrom.

To employ the furfuryl alcohol polymer-furfural system as a casting or coating material, there is added to such system a small measured amount of an acid catalyst which may be the same or which may be different from the acid catalyst initially employed in the furfuryl alcohol polymerization. Depending upon the temperature and the amount of catalyst, the system will set up either slowly or rapidly. Conditions favoring a rapid hardening would be higher amounts of catalysts and higher temperatures, or both.

Therefore as catalyst, either in the initial polymerization of the furfuryl alcohol in the first stage or as catalyst for setting up the system in the second stage, there may be employed the usual sources of hydrogen ion, as for instance organic acids, inorganic acids, aniline hydrochloride, benzene sulfonic acid, sulfuric acid, sulfonic acid, hydrochloric acid. However, better controls of condensation is obtained without introduction into the system of ions which may ultimately be found to be undesirable by the employment of catalytic amounts of, for instance, benzene sulfonic acid. These catalytic amounts may be from about $\frac{1}{100}\%$ by weight to about $\frac{1}{10}\%$ by weight of the system, either more or less, depending upon the temperature employed and the amount of catalyst added.

As has been previously indicated it is recommended, since the polymerization is exothermic and it is desired to control the degree of polymerization, that the amount of catalyst used be in small amounts as practicable to produce the necessary hydrogen ion concentration. It is for this reason that the strong inorganic acids, although operable, are not recommended particularly for use in the condensation polymerization stage of the furfuryl alcohol.

As has been indicated, when using furfural as the crosslinking or curing agent in the production of materials primarily used as cements or bonding agents, or as air-drying, film-forming compositions, the crosslinking will preferably be induced by a material providing hydrogen ions in the system to be hardened; that is, a system containing (a) the hardening agent furfural and (b) the homopolymer of furfuryl alcohol. However, where it is desired to prepare a pot or cast resin, the curing may be performed by heating a composition containing (a) the crosslinking or hardening agent, furfural and (b) the homopolymer, since the action of heat, in the presence of trace amounts of hydrogen ion, will act as an initiator of the cure or crosslinking in the fashion in which an acid environment at room temperature will induce crosslinking. By this means it would be possible, therefore, first to coat a wire with a mixture capable of being cured by heat, and subsequently to bake such coated wire and form upon its surface a set or cured final resin possessing very high resistance to chemicals and, in the set condition, a very high resistance to solvent action.

The following specific examples are given merely as illustrative of the principles of the invention and are not to be deemed as limitative thereof.

EXAMPLE I

In the preparation of the polymer of furfuryl alcohol, 1414 parts by weight of furfuryl alcohol were charged into a jacketed vessel equipped with stirring mechanism and in which the temperature in the jacket and of the contents of the vessel could be observed. To the furfuryl alcohol there was added 1 part by weight of benzene sulfonic acid. The reaction was completed in about 2 hours and the temperature within the vessel within that period of time, was permitted to rise from room temperature to a temperature at which water vaporized and was removed from the vessel at the vacuum imposed on the vessel.

When about ½ of the theoretical amount of water formed by the reaction was collected as a distillate, the acid catalyst was neutralized by adding an amount of caustic alkali equivalent to the one part by weight of benzene sulfonic acid, thereby producing a neutral system.

At such time, it is recommended that the pressure in the vessel be decreased and the heating be continued until substantially all of the water has been removed. This will generally require an additional 30 to 50 minutes. It is also recommended that the initial stages of the reaction be performed under a vacuum of about 12 inches of mercury and that the heating be gradual in order that the loss of furfuryl alcohol be as small as possible; when the reaction has been completed, the vacuum may be increased to 24 inches of mercury, for instance, for the purpose of more effectively eliminating the water and to produce a final product containing about 1% moisture and generally less than this quantity. The final product is a viscous, mobile liquid having a viscosity of, in general, about 45 to 50 poises. Since the first stage polymerization product is to be subsequently reacted with furfural, it is recommended that the furfural be added at this point to the vessel since the furfural is a solvent for the polymer and discharge of the vessel will be thus facilitated.

To the amount of polymer produced in the first stage described immediately above, there is added 536 parts by weight of furfural and this product may be set up at room temperature by adding thereto an acid catalyst, as for instance, sodium bisulfate. This is added generally in a concentration by weight of from 5 to 10% and a final set product is obtained in a period of time of from 20 minutes to 180 minutes depending on the system, the type of catalyst, the amount of catalyst and the temperature at which it is desired to set up the resin to produce the final plastic, as for instance, a coating.

Although the furfuryl alcohol condensation product may be dissolved for instance in benzene as a solvent, or in furfural as a solvent, it is believed that in the presence of acid catalyst and furfural, a copolymerization occurs probably with crosslinking, by reason of the presence of the aldehyde group, which produces a final product different from the set-up product obtained in the presence of an acid catalyst when the furfuryl alcohol polymer in benzene is treated in the same fashion with the same acid catalyst.

This is substantiated by the fact that the resistance to acetone in the case of the copolymer produced with furfural far exceeds that of the final plastic produced from additional polymerization of the first stage condensation polymer in benzene as shown in the data given below:

Table 1.—Appearance of samples

| Acetone Time of Contact in Hours | Stage One Polymer | Crosslinked Furfural with Stage One Polymer |
| --- | --- | --- |
| 24 | Cracked and rubbery dull surface | No change. |
| 72 | Soft and complete failure | Do. |
| 336 |  | Do. |

Further evidence of a difference in composition between the first stage condensation polymer and the furfural copolymer of the present invention resides in the resistance of the latter to the action of chromic acid.

The tensile strength of an acid-set furfuryl alcohol condensation polymer, as compared with the crosslinked polymer, indicates a great difference in strength. Whereas the tensile strength of the former was 1300 pounds per square inch, the tensile strength of the latter was 2000 pounds per square inch. In commercial use, it will be understood that fillers, aggregates of generally known and accepted types, can be employed with the product of the present invention to make cements and coating compositions. The amount of aggregate employed can vary greatly depending upon the characteristics desired in the end product, and may be from a few percent up to 85 to 90%. Such filler or aggregate, when it is desired to use a cement or coating in an environment where acid resistance is desired, will generally be carbon black. Thus such fillers may be ground glass, talc, titanium dioxide, pyrophyllite, pigments, and if desired, wood flour or other vegetable fillers.

What is claimed is:

1. The method of producing a hardened, set and cured copolymer of furfural and furfuryl alcohol which comprises heating furfuryl alcohol in an acidic environment and in the absence of furfural until a condensation homopolymer possessing a viscosity of 30 to 200 poises is produced, adding an alkali to neutralize the acidic environment, separating the condensation polymer from the reaction environment and then curing the condensation homopolymer by contact with 10% to 400% by weight of furfural based upon the weight of the condensation polymer under acidic conditions.

2. The set resinous product formed by the method of claim 1.

3. A composition capable of being cured to a hard, set, final resin in an acidic environment comprising (a) a component consisting of a condensation homopolymer of furfuryl alcohol of a viscosity of 30 to 200 poises and formed by polymerizing furfuryl alcohol in an acidic environment free of furfural and (b) furfural, the amount of (b) being 10% to 400% of the weight of (a).

References Cited in the file of this patent

UNITED STATES PATENTS 2,343,973    Harvey    Mar. 14, 1944
2,416,038    Adams    Feb. 18, 1947